United States Patent
Diab et al.

(10) Patent No.: US 8,301,819 B2
(45) Date of Patent: Oct. 30, 2012

(54) METHOD AND SYSTEM FOR DOCKING A LAPTOP WITH ETHERNET A/V BRIDGING TO GUARANTEE SERVICES

(75) Inventors: Wael William Diab, San Francisco, CA (US); Amit Oren, Los Altos Hills, CA (US); Yongbum Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 292 days.

(21) Appl. No.: 11/962,577

(22) Filed: Dec. 21, 2007

(65) Prior Publication Data

US 2008/0288702 A1 Nov. 20, 2008

Related U.S. Application Data

(60) Provisional application No. 60/917,870, filed on May 14, 2007.

(51) Int. Cl.
*G06F 13/00* (2006.01)
(52) U.S. Cl. ........................ 710/303; 709/221
(58) Field of Classification Search .................. 710/303; 709/221, 220, 223, 231
See application file for complete search history.

(56) References Cited

U.S. PATENT DOCUMENTS

| | | | | |
|---|---|---|---|---|
| 5,488,575 | A * | 1/1996 | Danielson et al. | 713/321 |
| 7,483,964 | B1 * | 1/2009 | Jackson et al. | 709/221 |
| 2007/0206513 | A1 * | 9/2007 | Cho et al. | 370/254 |

* cited by examiner

*Primary Examiner* — Clifford Knoll
(74) *Attorney, Agent, or Firm* — Duane S. Kobayashi (57) ABSTRACT

Methods and systems for docking a laptop with Ethernet A/V bridging to guarantee services are disclosed and may include interfacing a portable computing device with a docking station using an Ethernet interface, and utilizing audio/video (AV) bridging for communicating data between the portable computing device and one or more devices coupled to the docking station. AV bridging may be utilized based on latency requirements of the data communication. The interfacing may include directly coupling an Ethernet port of the docking station to an Ethernet port of the portable computing device. Alternatively, the interfacing may include coupling an Ethernet port of the docking station to an Ethernet port of the portable computing device via an Ethernet cable. The portable computing device may be powered via the Ethernet interface, and may utilize power over Ethernet protocol. The docking station may include a passive or active docking station.

20 Claims, 5 Drawing Sheets

METHOD AND SYSTEM FOR DOCKING A LAPTOP WITH ETHERNET A/V BRIDGING TO GUARANTEE SERVICES

CROSS-REFERENCE TO RELATED APPLICATIONS/INCORPORATION BY REFERENCE

This patent application makes reference to, claims priority to and claims benefit from U.S. Provisional Patent Application Ser. No. 60/917,870 filed on May 14, 2007.

The above stated application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to network communication. More specifically, certain embodiments of the invention relate to a method and system for docking a laptop with Ethernet A/V bridging to guarantee services.

BACKGROUND OF THE INVENTION

An increasing amount of data, and in particular multimedia content, transmitted over networks has led to much research into ways to improve the quality and reliability of streaming data over bridged local area networks. Accordingly, the IEEE is in the process of standardizing a suite of protocols collectively known as Audio Video Bridging (AVB). The individual protocols include, among others, IEEE P802.1AS—IEEE Standard for Local and Metropolitan Area Networks—Timing and Synchronization for Time-Sensitive Applications in Bridged Local Area Networks, IEEE P801.1Qat—IEEE Standard for Local and Metropolitan Area Networks: Virtual Bridged Local Area Networks—Amendment 9: Stream Reservation Protocol (SRP) and IEEE P802.1Qav: IEEE Standard for Local, and Metropolitan Area Networks: Virtual Bridged Local Area Networks—Amendment 11: Forwarding and Queuing for Time-Sensitive Streams.

Applications of these protocols include streaming compressed and/or uncompressed audio and/or video between various pieces of equipment. An exemplary transmission may comprise streaming uncompressed audio from an audio/video receiver to multiple networked speakers over an Ethernet network. In this regard, it may be necessary that the rendering of audio in all speakers is synchronized so as not to affect the listener's experience. In this manner, the audio video bridging protocols are likely to be deployed in situations where quality of service is paramount to the user experience.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for docking a laptop with Ethernet A/V bridging to guarantee services, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for docking a laptop with Ethernet A/V bridging to guarantee services. Exemplary aspects of the invention may comprise interfacing a portable computing device with a docking station using an Ethernet interface, and utilizing audio/video (AV) bridging for communicating data between the portable computing device and one or more devices coupled to the docking station. AV bridging may be utilized based on latency requirements of the data communication. The interfacing may include directly coupling an Ethernet port of the docking station to an Ethernet port of the portable computing device. Alternatively, the interfacing may comprise coupling an Ethernet port of the docking station to an Ethernet port of the portable computing device via an Ethernet cable. The portable computing device may be powered via the Ethernet interface, and may utilize power over Ethernet protocol. The docking station may include a passive or active docking station.

Figure 1:
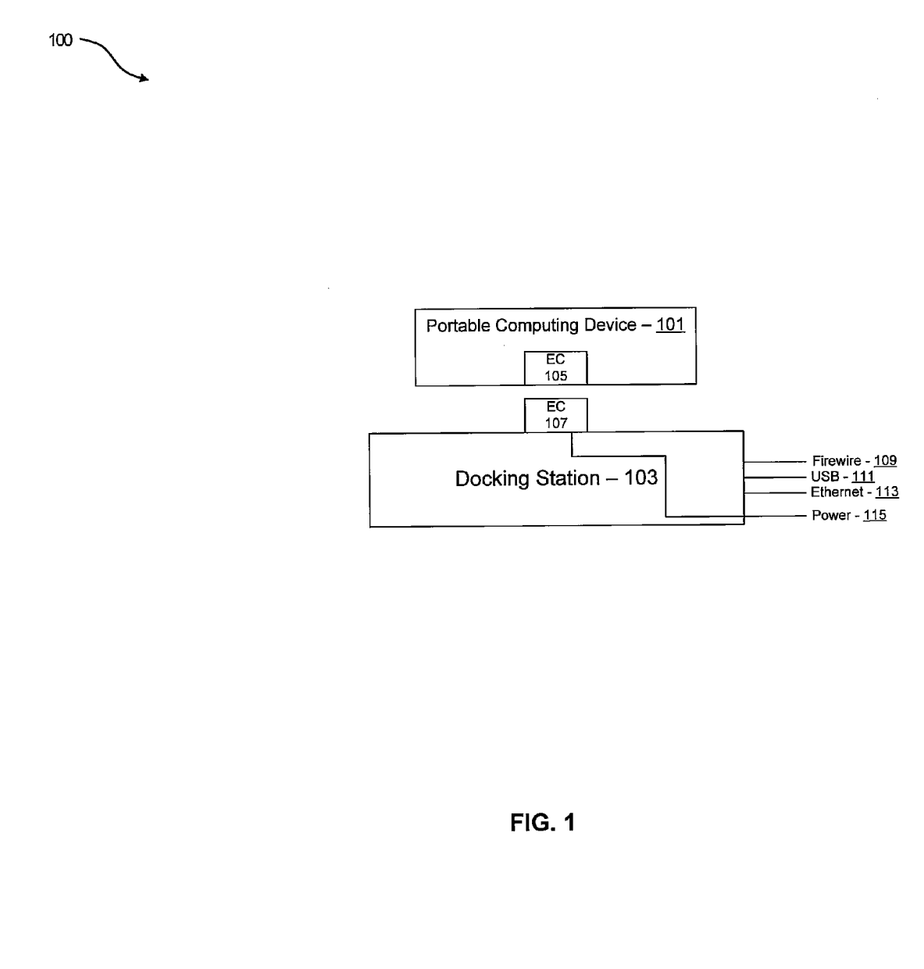
FIG. 1 is a block diagram that illustrates coupling of a portable computing device to a docking station using an Ethernet Interface with a connector in which power is supplied via the Ethernet interface, in accordance with an embodiment of the invention.

FIG. 1 is a block diagram that illustrates coupling of a portable computing device to a docking station using an Ethernet Interface with a connector in which power is supplied via the Ethernet interface, in accordance with an embodiment of the invention. Referring to FIG. 1, there is shown a portable computing device docking station configuration 100 comprising a portable computing device 101, a docking station 103, a portable computing device Ethernet connection 105, a docking station Ethernet connection 107, and docking station Firewire, USB, Ethernet and power ports 109, 111, 113 and 115, respectively. The docking station 103 may comprise suitable circuitry, logic and/or code to accept signals from the Firewire, USB, Ethernet, and/or power ports 109, 111 and 113, respectively, and communicate these signals to the portable computing device 101.

In operation, the portable computing device 101 may be coupled to the docking station 103 utilizing the portable computing device Ethernet connection 105 and the docking station Ethernet connection 107. In accordance with an embodiment of the invention, information comprising control data and/or regular data flowing between the portable computing device 101 and the docking station 103 via the portable computing device Ethernet connection 105 and the docking station Ethernet connection 107 may be packetized into Ethernet frames, which may carry text, video, voice and/or multimedia information.

Audio/video (AV) bridging may be utilized to communicate data via the portable computing device 101 and docking station Ethernet connections 105 and 107. In this manner, a portion of the available bandwidth may be reserved for devices that may require minimal latency, such as the keyboard, mouse and display. The transmission of a particular data stream may be guaranteed by applying AV bridging. Alternatively, for data that may not have stringent latency requirements, standard Ethernet protocol may be utilized, such as for data that may be communicated out of the local network and in particular data that may be communicated via TCP/IP over the Internet, for example, with varying speeds.

The different types of data exchanged between the portable computing device 101 and the docking station 103 may be assigned to different levels of QoS (Quality of Service) and CoS (Class of Services) to ensure proper level of functionality and appropriate control over latency and bandwidth requirements. Power may be supplied to the portable computing device 101 via the docking station Ethernet connection 107 and portable computing device Ethernet connection 105 for supply and/or charging purposes.

Figure 2A:
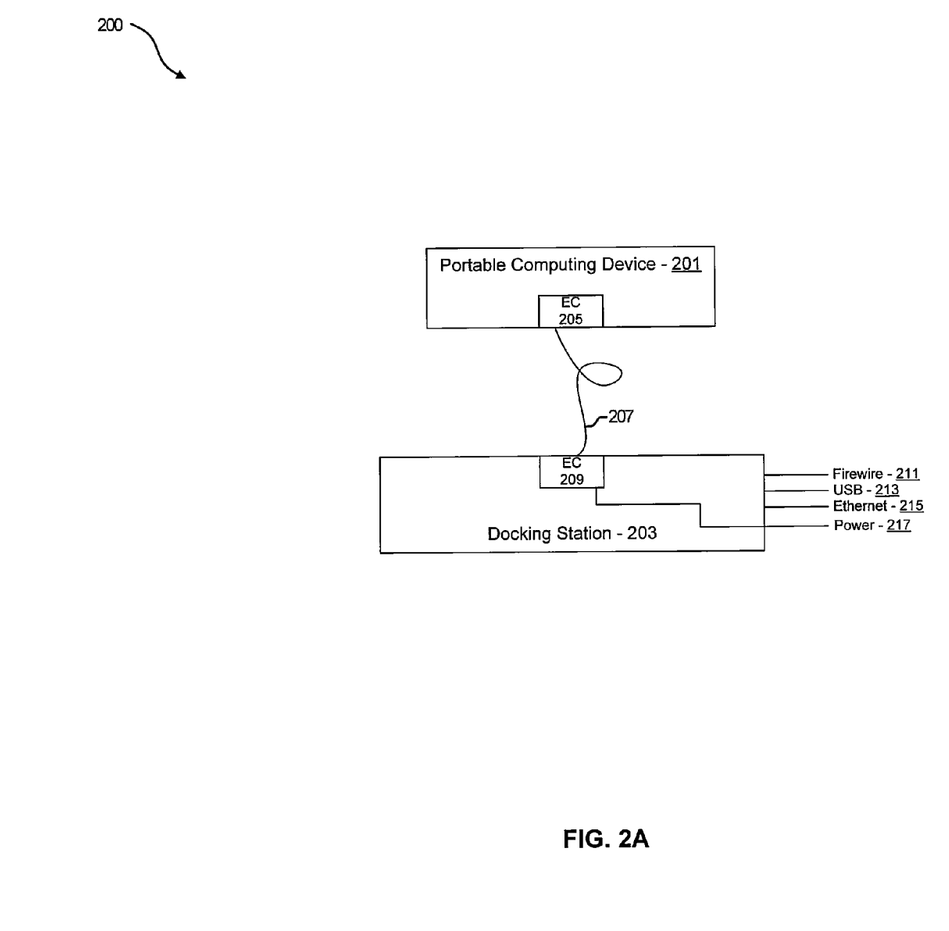
FIG. 2A is a block diagram that illustrates coupling of a portable computing device to a docking station using an Ethernet Interface with an Ethernet cable in which power is supplied via the Ethernet interface and Ethernet cable, in accordance with an embodiment of the invention.

FIG. 2A is a block diagram that illustrates coupling of a portable computing device to a docking station using an Ethernet Interface with an Ethernet cable in which power is supplied via the Ethernet interface and Ethernet cable, in accordance with an embodiment of the invention. Referring to FIG. 2, there is shown a portable computing device docking station configuration 200 comprising a portable computing device 201, a docking station 203, a portable computing device Ethernet connection 205, an Ethernet cable 207, a docking station Ethernet connection 209 and docking station Firewire, USB, Ethernet and power ports 211, 213, 215 and 217, respectively. The docking station 203 may comprise suitable circuitry, logic and/or code to accept signals from the Firewire, USB, Ethernet, and/or power ports 211, 213 and 215, respectively, and communicate these signals to the portable computing device 201 via connection 209.

In operation, the portable computing device 201 may be coupled to the docking station 203 utilizing the portable computing device Ethernet connection 205, the Ethernet cable 207 and the docking station Ethernet connection 209. Data communicated through the Ethernet connections 205 and 209 and the Ethernet cable 207 may be IEEE Ethernet standard compliant. In accordance with an embodiment of the invention, information comprising control data and/or regular data flowing between the portable computing device 201 and the docking station 203 via the portable computing device Ethernet connection 205, the Ethernet cable 207 and the docking station Ethernet connection 209 may be packetized into Ethernet frames, which may carry text, video, voice and/or multimedia information.

The format of the Ethernet frames may be specified in applicable standards documents, such as IEEE 802 standards. The Ethernet frames may contain an address (for example, in a destination address field within the Ethernet frames), which indicates that the Ethernet frames are to be transported to the portable computing device 201 via the docking station 203. The Ethernet frames may comprise a designation (for example, in an EtherType field of the Ethernet frames), which indicates that the Ethernet frame is being utilized to encapsulate multimedia content of a particular format. Formats may comprise, for example, raw audio/video, HDMI, and DisplayPort. The Ethernet frames may also comprise a traffic class identifier, which may enable the reception of data services in accordance with Audio/Video Bridging and/or Audio/Video Bridging extensions (any combination of which is referred to herein as "AVB"). These services may comprise prioritized transport of the Ethernet frames to enable the time duration for transport across a network to meet latency targets associated with the specified traffic class.

The different types of data exchanged between the portable computing device 201 and the docking station 203 may be assigned to different levels of QoS (Quality of Service) and CoS (Class of Services) to ensure proper level of functionality and appropriate control over latency and bandwidth requirements. Power may be supplied to the portable computing device 201 via the docking station Ethernet connection 209 and portable computing device Ethernet connection 205 for supply and/or charging purposes.

Figure 2B:
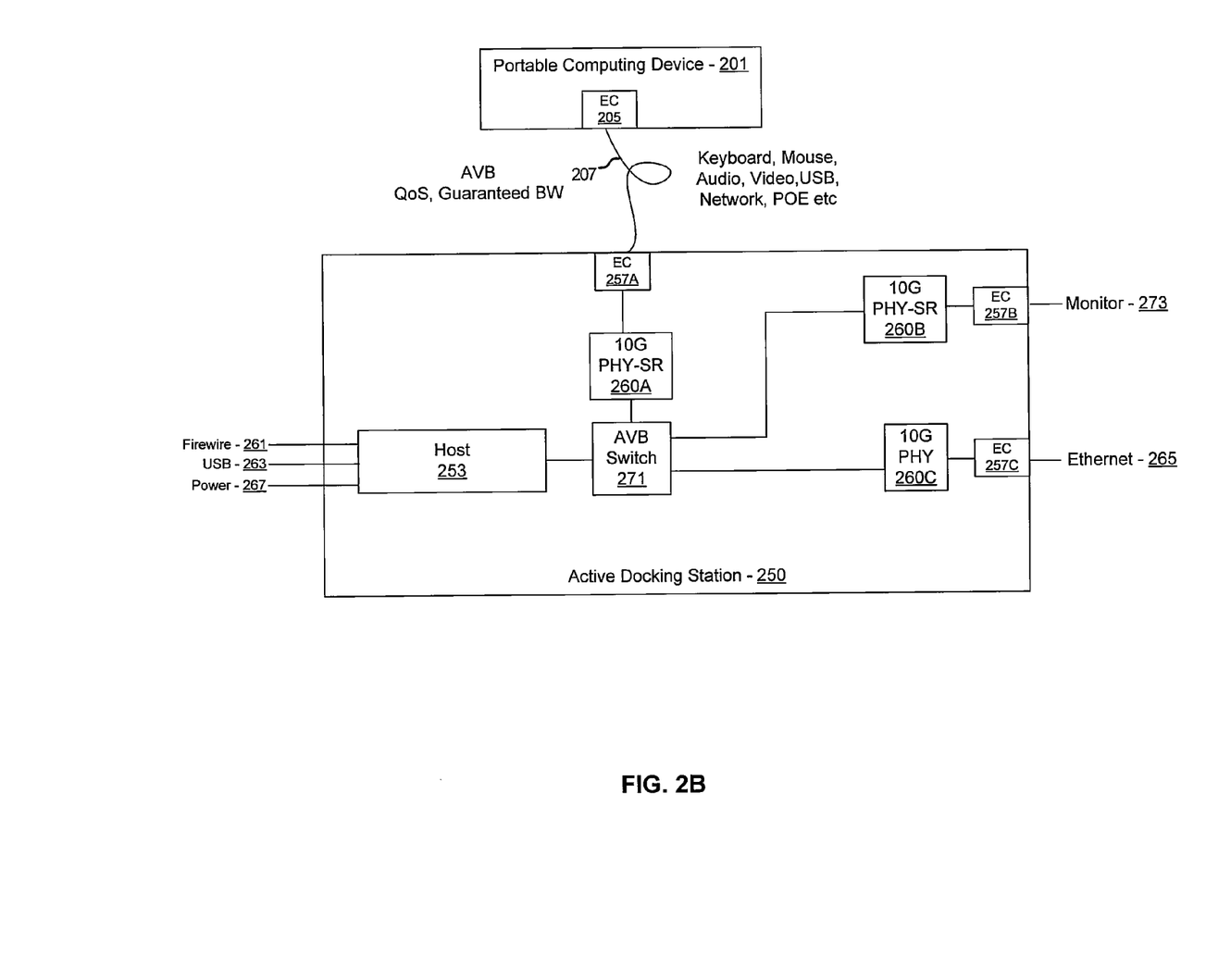
FIG. 2B is a block diagram that illustrates an active docking station in accordance with an embodiment of the invention.

FIG. 2B is a block diagram that illustrates an active docking station in accordance with an embodiment of the invention. Referring to FIG. 2B there is shown the portable computing device 201 and an active docking station 250 comprising a host 253, a storage 255, an Ethernet connection 257A, a processor 259, a LOM 362, an AVB switch 271, 10 GB PHYs 260A and 260B and external Firewire, USB, Ethernet, power and monitor connections 261, 263, 265, 267 and 273, respectively. The Ethernet cable 207 may be utilized to couple the portable computing device 201 to the active docking station 250. In another embodiment of the invention, the Ethernet connectors 205 and 257A may be configured such that the portable computing device 201 and the active docking station 250 may be directly coupled without the need of the Ethernet cable 207.

The host 253 may comprise suitable circuitry, logic and/or code for enabling processor, memory and storage functions of the active base station 250. The processor function may comprise control and/or data processing operations for the active docking station 250 and may also enable execution of application programs and/or code. The host 253 may enable communication between the portable computing device 201 and a plurality of external components, such as a monitor, a keyboard, mouse and printer, for example, via the Firewire port 261 and the USB port 263. The storage functions of the host 253 may be accessed by the portable computing device or other external computing device that may interface with the active docking station 250 via the Ethernet connections 257A or 257C.

The AVB switch 271 may comprise suitable circuitry, logic and/or code for providing AV bridging capability to the active docking station 250. This capability may comprise prioritized transport of the Ethernet frames to enable the time duration for transport across a network to meet latency targets associated with the specified traffic class. The AVB switch 271 may be coupled to the 10G PHYs 260A, 260B and 260C and the host 253. The AVB switch 271 may communicate with the 10G PHYs 260A, 260B and 260C via the XGMII interface, for example.

The AVB switch 271 may comprise embedded MAC capability and may enable addressing and/or access control to a network and may enable the transmission of the Ethernet frames via a network. In this regard, the AVB switch 271 may be enabled to buffer, prioritize, or otherwise coordinate the transmission and/or reception of data. The AVB switch 271 may be enabled to perform additional packetization, depacketization, encapsulation, and decapsualtion of data. The AVB switch 271 may enable generation of header information within the Ethernet frames, which enable the utilization of AVB services within a network for transport of the Ethernet frames. The AVB switch 271 may also enable traffic shaping of transmitted Ethernet frames by determining time instants at which Ethernet frames may be transmitted to a network. The AVB switch 271 may also enable generation of header information within the Ethernet frames, which utilize conventional Ethernet services. The conventional Ethernet services may not utilize traffic shaping and/or AVB services for example.

The 10G PHYs 260A, 260B and 260C may comprise suitable circuitry, logic and/or code that may enable the reception of bits from Ethernet frames. The 10G PHY 260B may line encode the received bits to enable transmission via the Ethernet connection 257B. 10G is an exemplary Ethernet bit rate; various embodiments of the invention may also be practiced at other bit rates suitable for carrying Ethernet traffic.

In an embodiment of the invention, the 10G PHYs 260A and 260B may comprise short reach 10G PHYs, since the expected range of communication may be approximately one meter or less, for example. A short reach 10G PHY may comprise a 10G PHY with the elimination of DSP and analog circuitry utilized for longer links, noise and other impediments.

The 10G PHYs 260A, 260B and 260C may also receive line coded bits via the Ethernet connections 257A, 257B and 257C, and may decode the received line coded bits, which may be sent to the AVB switch 271.

In operation, the portable computing device 201 may be coupled to the active docking station 250. The active docking station 250 may utilize AV bridging to guarantee services to the portable computing device 201. AV bridging may be utilized to guarantee services using a simple Ethernet connector, without the need for a high cost specialized connector. The active docking station 250 may enable AVB capability via the AVB switch 271 for peripherals that may require guaranteed service and/or low latency, such as monitors, speakers, keyboard and mouse, for example. Accordingly, a percentage of the total available bandwidth may be reserved via AVB for these devices, whereas the remaining devices may not be as susceptible to higher latency. In addition, an AVB master clock may be utilized to coordinate Ethernet frame timing for applications that require guaranteed service and accurate timing, such as video, for example.

The docking station 250 may communicate with external networks or devices via external connections 261, 263, 265, 267 and 273, independent of whether a device is docked into the active docking station 250. Data may be stored in the host 253 within the active docking station 250 that may be accessed by a portable computing device interfaced via the Ethernet connection 257A. In other words, the active station 250 may be accessible by other devices even when no portable computing device is connected to the Ethernet connection 257A.

Figure 3A:
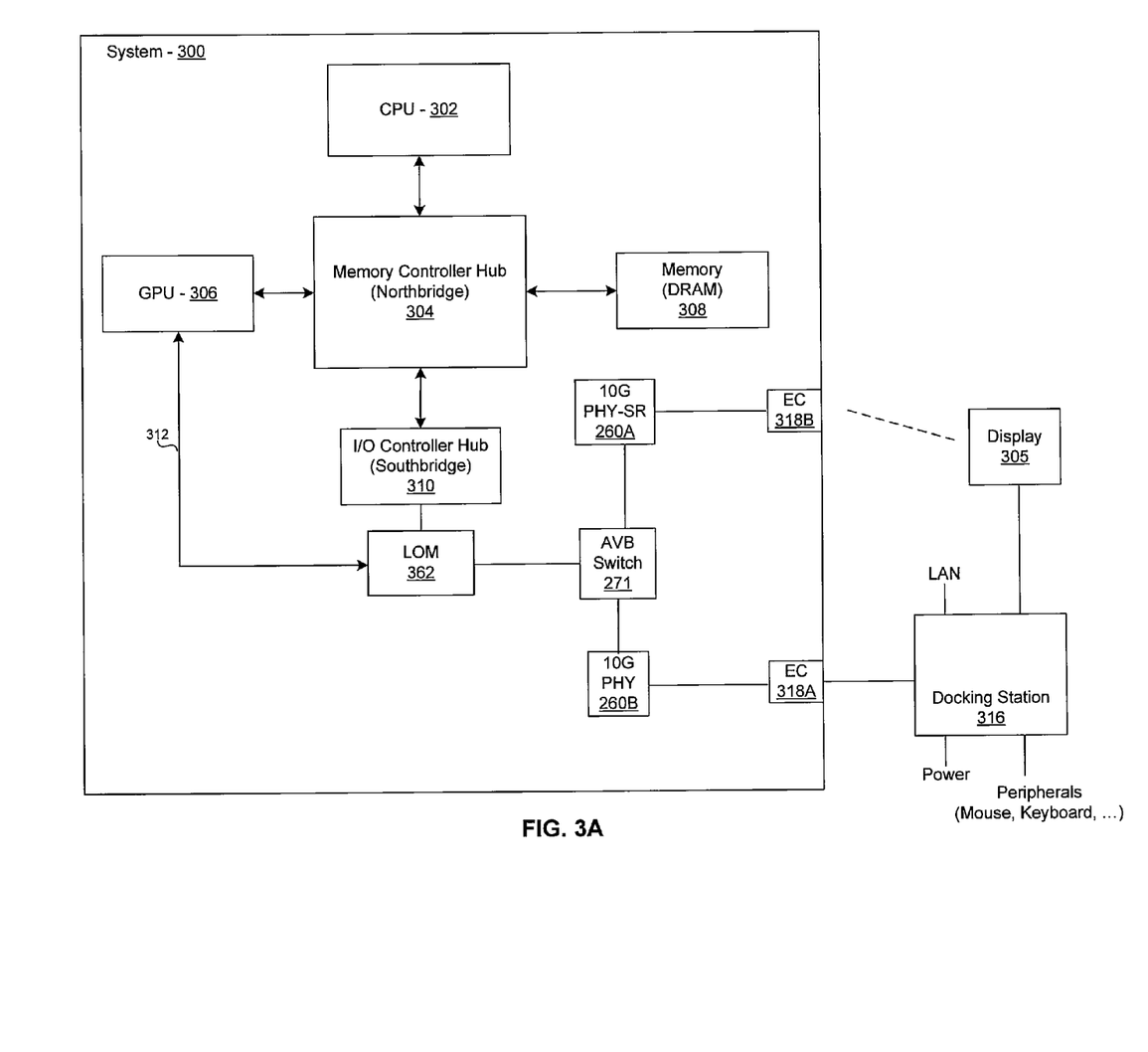
FIG. 3A is a diagram illustrating an exemplary system enabled to transmit and/or receive Ethernet data streams, in accordance with an embodiment of the invention.

FIG. 3A is a diagram illustrating an exemplary system enabled to transmit and/or receive Ethernet data streams, in accordance with an embodiment of the invention. Referring to FIG. 3A the system 300 may comprise a CPU 302, a memory controller hub (MCH) 304, a graphics processing unit (GPU) 306, a memory block 308, an input/output controller hub (ICH) 310, Ethernet connectors 318a and 318b, a LAN on motherboard (LOM) 362, the 10G PHYs 260A and 260B and the AVB switch 271. The system 300 may be substantially similar to the portable computing device 205, described with respect to FIG. 2A, and the 10G PHYs 260A and 260B and the AVB switch 271 may be as described with respect to FIG. 2B. In an embodiment of the invention, the 10G PHY 260A may comprise a short reach PHY.

There is also shown a display 305 and a docking station 316. The docking station 316 may be substantially similar to the docking station 203, described with respect to FIG. 2A. The display 305 may comprise suitable circuitry, logic and/or code for displaying data from the system 300 via the docking station 316. The display 305 may be coupled to the docking station 316 via an Ethernet connector. In this manner, AV bridging may be utilized to communicate data to the display 305.

The CPU 302 may comprise suitable circuitry, logic and/or code that may enable processing data and/or controlling operations of the system 300. In this regard, the CPU 302 may be enabled to provide control signals to the various other blocks comprising the system 300. The CPU 302 may also enable execution of applications programs and/or code. The applications programs and/or code may enable the communication between the system 300 and a plurality of external components, such as a monitor, a keyboard, mouse and printer, for example. AVB may be utilized to reserve appropriate bandwidth, timing coordination and resource reservation to the external components according to the latency requirements of the components. The CPU 302 may be accessed via the MCH 304.

The MCH 304 may comprise suitable circuitry, logic and/or code that may enable the storage and/or retrieval of data at high data transfer rates. In various embodiments of the invention, the MCH 304 may be referred to as a northbridge (NB).

The GPU 306 may comprise suitable circuitry, logic and/or code for generating, rendering, and/or manipulating graphics data. The GPU 306 may output uncompressed video and/or graphics. The GPU 306 may be enabled to output a raw video stream to the LOM 362. The GPU 306 may be enabled to output graphics/video to the LOM 362 via the bus 312. In this regard, the graphics/video may, for example, comprise raw pixel data, DisplayPort packets, or data formatted according to DVI or HDMI standards.

The memory 308 may comprise suitable circuitry, logic and/or code that may enable the storage and/or retrieval of data. For example, the memory 308 may enable the storage and/or retrieval of data from components external to the system 300 and coupled to the system 300 via the Ethernet connectors 318a and/or 318b. The memory 308 may also enable the storage and/or retrieval of encryption keys, which may be utilized for encryption and/or decryption of data. The memory 308 may additionally store data, for example, configuration data and/or state variables utilized in controlling/configuring the various blocks of the system 300. The memory 308 may also enable the storage of code, which enables the execution of multimedia applications, for example. The memory 308 may utilize various technologies, such as dynamic random access memory (DRAM), which enable data to be stored and/or retrieved at sufficiently high data rates to enable high performance multimedia applications, for example.

The ICH 310 may comprise suitable logic, circuitry, and/or code that may enable the storage and/or retrieval of data from peripheral devices such as hard disk drives. The ICH 310 may also enable the retrieval of input signals and/or interrupt signals from peripheral devices, such as keyboard device and mouse devices, and/or other peripheral devices including various peripheral component interconnect (PCI) devices, for example, communicated via the LAN subsystem 314 and the Ethernet connectors 318a and/or 318b. In various embodiments of the invention, the ICH 310 may be referred to as a southbridge (SB).

The LOM 362 may comprise suitable circuitry, logic and/or code to enable the transmission and/or reception of Ethernet frames. The LOM 362 may comprise PHY layer functions and MAC layer functions. The LOM 362 may enable transmission and/or reception of Ethernet frames at various transfer rates, such as 10 Mbps, 100 Mbps, 1,000 Mbps (or 1 Gbps) and/or 10 Gbps, or other rates (for example, higher rates). Also, the LOM 362 may enable coordination of communications between the system 300 and one or more remote systems. In this regard, the LOM 362 may enable utilization of AVB. Additionally, the LOM 362 may be enabled to convert data bits to physical signals and output the symbols onto a physical link. Similarly, the LOM 362 may be enabled to receive symbols via a physical link, convert them into bits of data, and assemble the bits into protocol data units (e.g. Ethernet frames and/or DP micro-packets). In this regard, exemplary physical links may comprise twisted pair cables and/or wireless channels.

The PHY layer functions may enable transmission of Ethernet frames via a communication medium. The PHY layer functions may also enable reception of Ethernet frames via the communication medium. The PHY layer functions may generate signals for transmission that are suitable for the physical medium being utilized for transmitting the signals. For example, for an optical communication medium, the PHY layer may generate optical signals, such as light pulses, or for a wired communication medium, the PHY layer may generate electromagnetic signals.

The MAC layer functions may enable orderly communication between systems that are communicatively coupled via a shared communication medium. The MAC layer may comprise one or more coordination functions (CF) that enable a system to determine when it may attempt to access the shared communication medium. For example, in a wired communication medium, for example Ethernet, a CF may utilize a carrier sense multiple access with collision detection (CSMA/CD) algorithm. The MAC layer functions may implement mechanisms for scanning the communication medium to determine when it is available for transmission of signals. The MAC layer functions may comprise back off timer mechanisms, which may be utilized by a system to determine how often to attempt to access a communication medium, which is currently determined to be unavailable.

The MAC layer functions may also enable AVB capabilities. In this regard, the MAC layer functions may determine a traffic class which is associated with transmitted Ethernet frames. Based on the determined traffic class, the MAC layer functions may perform traffic shaping by determining a time instant at which an Ethernet frame may be sent to the network via the Ethernet interface. That time instant may be determined based on a time instant at which one or more preceding Ethernet frames were also transmitted via the Ethernet interface. The time instant may also be determined based on stored "credits", which may indicate a quantity of octets of Ethernet frame data that may be transmitted at "line rate" before transmission of subsequent Ethernet frames is suspended pending the accumulation of additional credits.

The MAC layer functions, which support AV Bridging, may also enable the end-to-end transport of Ethernet frames based on specified latency targets by initiating admission control procedures. The latency targets, which may specify a maximum time duration for the transport of Ethernet frames across the network, may be determined based on a specified traffic class. A destination Ethernet device may initiate admission control procedures by initiating a registration request across the network to the source Ethernet device. A successful registration may enable the network to reserve resources for the transport of Ethernet frames between the source Ethernet device and the destination Ethernet device, in accordance with the specified latency targets. In this manner, the required Quality of Service (QoS) may be assured for the various communication functions performed by the system 300.

The Ethernet MAC layer functions may also enable an exchange of timing synchronization information between communicating Ethernet devices. Individual Ethernet MAC layer functions associated with each of a plurality of Ethernet devices within a LAN may exchange timing synchronization with the Ethernet MAC layer function associated with a specified Ethernet device associated with the LAN, wherein the specified Ethernet device may provide system timing for the plurality of Ethernet devices associated with the LAN. The traffic shaping and/or timing synchronization capabilities may enable AV Bridging services to support isochronous and/or real time services, such as streaming media services.

In various embodiments of the invention, the LOM 362 may utilize code, such as firmware, and/or data stored within the memory 308 to enable the operation of MAC layer functions and/or PHY layer functions within an Ethernet LAN, for example, via the docking station 316. The firmware may also enable encapsulation of Display Port mini-packets and/or uncompressed video and/or graphics in Ethernet frames within the LOM 362. In addition, the firmware may enable de-encapsulation of Display Port mini-packets and/or uncompressed video and/or graphics from Ethernet frames.

The bus 312 may couple the GPU 306 to the LOM 362. In this regard, the bus 312 may enable transporting multimedia content and associated auxiliary/control data between the GPU 306 and the LOM 362 without involving other blocks of the system 300, such as the northbridge 304 and the southbridge 310.

The Ethernet connectors 318a and 318b may enable physical connection of a docking station 316 or display 305 to the system 300. The Ethernet connector 318a may enable physical connection via an 8P8C connector and/or via an RJ45 connector, for example. The Ethernet connector 318b may be substantially similar to the Ethernet connector 318a.

In an exemplary embodiment of the invention, the system 300 may comprise a computing device, such as the portable computing device 201. In operation, the system 300 may receive Ethernet frames via the Ethernet connector 318b and the docking station 316. The LAN subsystem may utilize the PHY functionality to transmit the display packets to the display 305 via the Ethernet connector 318b and the docking station 316.

Various embodiments of the invention may utilize a plurality of Ethernet connectors for the reception and/or transmission of Ethernet frames from one or more networks. In an embodiment of the invention, Ethernet frames, which may encapsulate Display Port mini-packets, or which encapsulate uncompressed video data, may be transmitted and/or received via the Ethernet connector 318b, while conventional Ethernet frames may be transmitted/received via the Ethernet connector 318a, for example. In another embodiment of the invention, the unused Ethernet connector 318b may be turned off. In various embodiments of the invention, the Ethernet connector 318a may enable transmission and/or reception of Ethernet frames to/from a first network while the Ethernet connector 318b may enable transmission and/or reception of Ethernet frames to/from a second network. In an exemplary embodiment, 10G PHYs 260A and 260B may be coupled to each of the Ethernet connectors 318a and 318b.

In an embodiment of the invention, in instances when a computing device, such as the system 300 may be coupled to the docking station 316 via the Ethernet connector 318*b*, the services utilized by the system 300 that may be QoS or latency sensitive, may utilize AVB. Exemplary services may comprise LAN, data, display, speaker, keyboard and mouse. As the keyboard, mouse and display services may be latency and timing sensitive, they may communicate utilizing AVB. Accordingly, a specified percentage of the available bandwidth may be reserved for these services, regardless of the transmission speed, and may utilize timing synchronization and resource reservation as required. Services utilized by the system 300 that may not be latency sensitive, such as TCP/IP communication over the Internet, may not require AV bridging, and may utilize standard Ethernet protocol.

Figure 3B:
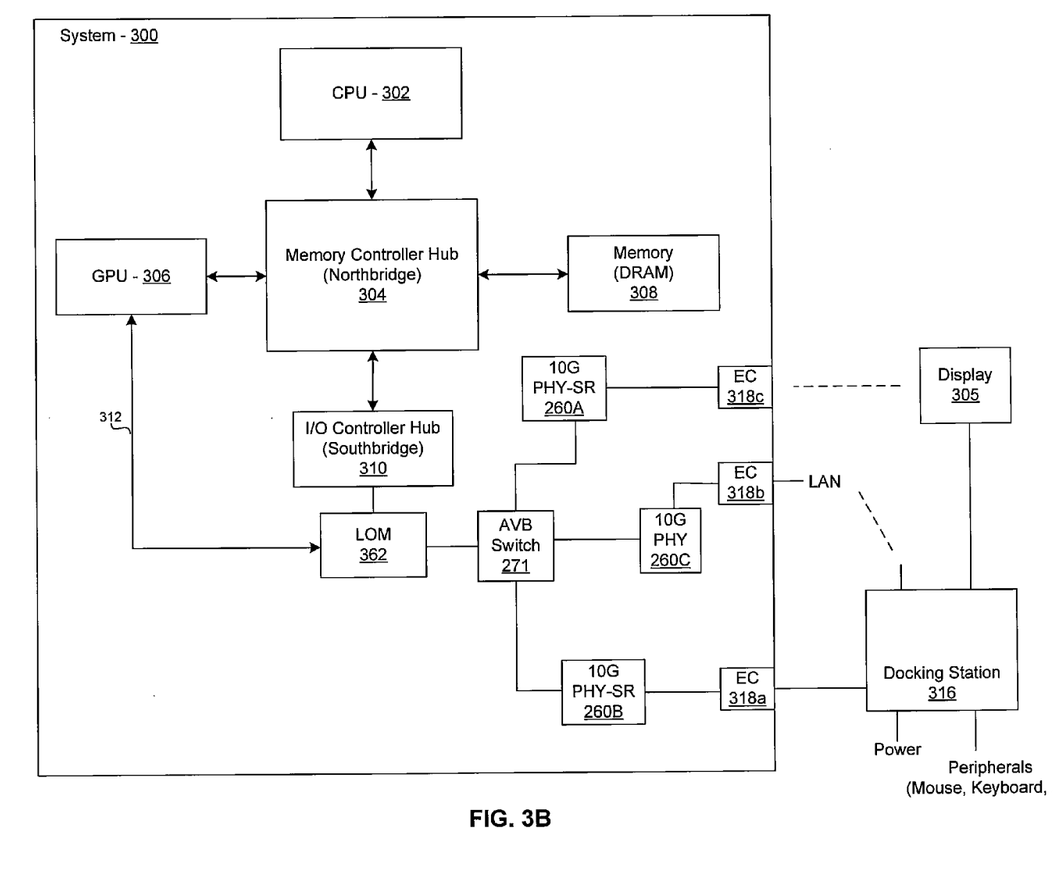
FIG. 3B is a block diagram illustrating the utilization of AV bridging to couple a docked laptop to a monitor, in accordance with an embodiment of the invention.

FIG. 3B is a block diagram illustrating the utilization of AV bridging to couple a docked laptop to a monitor, in accordance with an embodiment of the invention. Referring to FIG. 3B, the system 300 may comprise the CPU 302, the memory controller hub (MCH) 304, the graphics processing unit (GPU) 306, the memory block 308, the input/output controller hub (ICH) 310, Ethernet connectors 318*a*, 318*b* and 318*c*, the LOM 362, 10G PHYs 260A, 260B and 260C and the AVB switch 271. There is also shown a display 305 and a docking station 316. Each of the components shown in FIG. 3B may be as described with regard to FIG. 3A. The 10G PHYs 260A and 260B may comprise short reach PHYs.

In an embodiment of the invention, the display 305 may be coupled to the system 300 via the docking station 316. In another embodiment of the invention, the display 305 may be coupled to the system 300 via the Ethernet connector 318C, and other resources may be communicated to the system 300 via the docking station 316. In this manner, the AVB switch 271 may not be required. An AVB switch may be incorporated in a docking station and/or a portable computing device. Since the display of data may comprise an application that requires guaranteed services, Ethernet AV bridging may be utilized to communicate data to the display 305.

In an embodiment of the invention, in instances when a computing device, such as the system 300 may be coupled to the docking station 316 via the Ethernet connector 318*a*, and the display 305 may be coupled to the system 300 via the docking station 316, the services utilized by the system 300 that may be QoS or latency sensitive, may utilize AVB. Exemplary services may comprise data, display, speaker, keyboard and mouse. As the keyboard, mouse and monitor services may be latency sensitive, they may communicate utilizing AVB. Accordingly, a specified percentage of the available bandwidth may be reserved for these services, regardless of the transmission speed. Services utilized by the system 300 that may not be latency sensitive, such as TCP/IP communication over the Internet, may not require AV bridging, and may utilize standard Ethernet protocol.

In an embodiment of the invention, a method and system are disclosed for interfacing a portable computing device 101, 201 and/or 300 with a docking station 103, 203, 250 and/or 316 using an Ethernet interface 105/107, and utilizing audio/video (AV) bridging for communicating data between the portable computing device 201 and one or more devices coupled to the docking station 103, 203, 250 and/or 316. AV bridging may be utilized based on latency requirements of the data communication. The interfacing may include directly coupling an Ethernet port 107 of the docking station 103 to an Ethernet port 105 of the portable computing device 101. Alternatively, the interfacing may include coupling an Ethernet port 209 of the docking station 203 to an Ethernet port 205 of the portable computing device 201 via an Ethernet cable 207. The portable computing device 101, 201 and/or 300 may be powered via the Ethernet interface, and may utilize power over Ethernet protocol. The docking station may include a passive (130 and/or 203) or active (250) docking station.

Certain embodiments of the invention may comprise a machine-readable storage having stored thereon, a computer program having at least one code section for docking a laptop with Ethernet A/V bridging to guarantee services, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for network communication, the method comprising:

in a docking station comprising an Ethernet interface configured to mate with an Ethernet interface of a portable computing device, said docking station including one or more ports for connecting one or more data input/output devices that are configured to direct an operation of said portable computing device:
  communicating data between said portable computing device and said one or more data input/output devices coupled to said docking station utilizing IEEE 802.1 audio/video (AV) bridging over said Ethernet interface.

2. The method according to claim 1, comprising utilizing said AV bridging based on latency requirements of said data communication.

3. The method according to claim 1, comprising powering said portable computing device via said Ethernet interface of said docking station.

4. The method according to claim 1, comprising powering said portable computing device via said Ethernet interface of said docking station utilizing a power over Ethernet protocol.

5. The method according to claim 1, wherein said docking station comprises a passive docking station.

6. The method according to claim 1, wherein said docking station comprises an active docking station.

7. The method according to claim 1, comprising interfacing a display to said portable computing device, utilizing a second Ethernet interface of said portable computing device, while said portable computing device is coupled to said docking station.

8. The method according to claim 1, comprising coupling a display to said docking station via a second Ethernet interface of said docking station.

9. A system for network communication, the system comprising:
  one or more circuits for use in a docking station comprising an Ethernet interface configured to mate with an Ethernet interface of a portable computing device, said docking station including one or more ports for connecting one or more data input/output devices that are configured to direct an operation of said portable computing device:
    said one or more circuits enable communicating data between said portable computing device and said one or more data input/output devices coupled to said docking station utilizing IEEE 802.1 audio/video (AV) bridging over said Ethernet interface.

10. The system according to claim 9, wherein said one or more circuits enable said AV bridging based on latency requirements of said data communication.

11. The system according to claim 9, wherein said one or more circuits enable powering said portable computing device via said Ethernet interface of said docking station.

12. The system according to claim 9, wherein said one or more circuits enable powering said portable computing device via said Ethernet interface of said docking station utilizing a power over Ethernet protocol.

13. The system according to claim 9, wherein said docking station comprises a passive docking station.

14. The system according to claim 9, wherein said docking station comprises an active docking station.

15. The system according to claim 9, wherein said one or more circuits enable interfacing a display to said portable computing device, utilizing a second Ethernet interface of said portable computing device, while said portable computing deivce is coupled to said docking station.

16. The system according to claim 9, wherein said one or more circuits enable coupling a display to said docking station via a second Ethernet interface of said docking station.

17. The system according to claim 9, wherein said docking station includes a port that connects a keyboard for entry of data into said portable computing device.

18. The system according to claim 9, wherein said docking station includes a port that connects a pointing device for control of a graphical user interface element displayed by said portable computing device.

19. The system according to claim 9, wherein said docking station includes a USB port that connects a USB device to said portable computing device.

20. A method for network communication, the method comprising:
  in a docking station comprising an Ethernet interface configured to mate with an Ethernet interface of a portable computing device without using a cable:
    communicating data between said portable computing device and one or more devices coupled to said docking station utilizing IEEE 802.1 audio/video (AV) bridging over said Ethernet interface, wherein an Ethernet PHY associated with said Ethernet interface of said docking station is a PHY optimized for communication over an Ethernet link of 1 meter or less.

* * * * *